Figure 1:
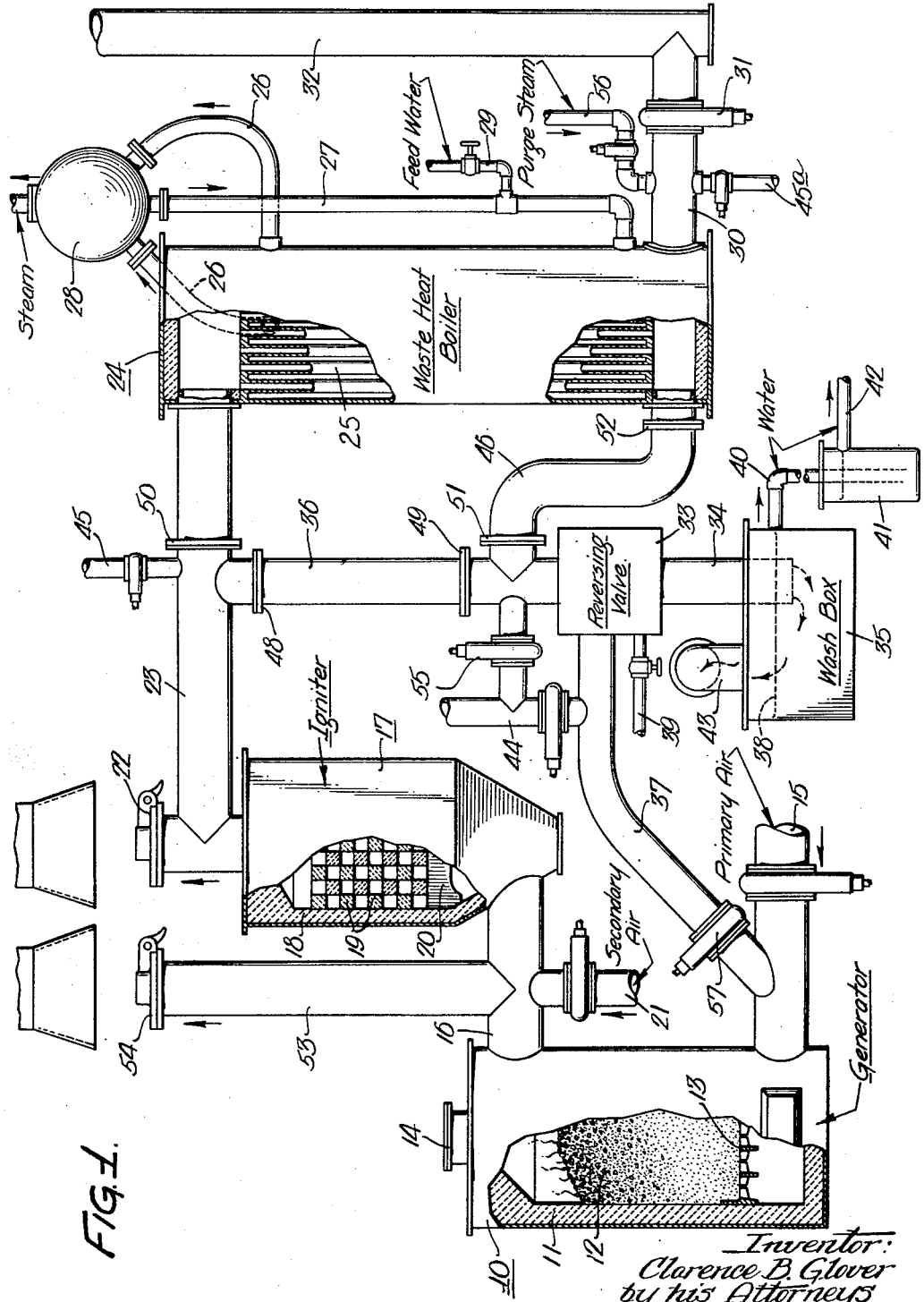

Aug. 12, 1952  C. B. GLOVER  2,606,827
METHOD OF PRODUCING LOW NITROGEN CONTENT GAS
Filed May 21, 1948  2 SHEETS—SHEET 2

Inventor:
Clarence B. Glover
by his Attorneys
Howson & Howson

Patented Aug. 12, 1952

2,606,827

UNITED STATES PATENT OFFICE 2,606,827

METHOD OF PRODUCING LOW NITROGEN CONTENT GAS

Clarence B. Glover, Springfield, Pa., assignor to United Engineers & Constructors Inc., Philadelphia, Pa., a corporation of Delaware Application May 21, 1948, Serial No. 28,424

12 Claims. (Cl. 48—204)

The present invention relates to a method of producing gas by a cyclic "blow" and "run" process in which heating gases are passed through at least a portion of the apparatus during the "blow" or heating portion of the cycle, which is subsequently traversed, during the "run" or gas generating portion of the cycle, by the product gas or by a gas making fluid used in its generation, which may become contaminated by residual heating gases remaining in the apparatus from the blow.

This application is a continuation in part of my copending application Serial No. 567,333, filed December 9, 1944, now abandoned.

The invention will be described, for illustration, in connection with the reduction of nitrogen contamination in the cyclic manufacture of blue water gas.

In ordinary cyclic blue water gas operation, an ignited bed of solid fuel such, for example, as coke, in a generator is alternately blasted with air, in a heating portion of the cycle termed the "blow," and with steam, in a water gas generating portion of the cycle termed the "run."

During the blow, the producer gas generated by the combustion of the fuel with the primary air blast is usually burned with secondary air for the recovery of heat therefrom. A portion of the heat of the burning producer gas is usually stored in a regenerator vessel, termed the "igniter," which is lined with refractory material and is provided with refractory checker-brick, after which further heat may be recovered by passing the resulting combustion products through a waste heat boiler to the atmosphere.

During the run, steam is passed through the fuel bed, usually alternately upwardly and downwardly and the heat stored in the fuel bed during the blow is utilized in the endothermic reaction of the steam with the carbon of the fuel to generate blue water gas. Usually at least a portion of the heat stored in the ignited, during the blow, is utilized to superheat the steam which is passed downwardly through the fuel bed, during the run, in which case that portion of the run is termed the "back-run."

Because of its relatively low temperature on issue from the base of the fuel bed, the back-run water gas is not customarily passed through the waste heat boiler. In some cases the hotter up-run water gas is passed through the waste heat boiler during the up-run, as well as the blow gases during the blow, while in other cases it is preferred to pass the blow gases therethrough, but not the up-run water gas. In still other cases it is preferred not to employ a waste heat boiler.

When a waste heat boiler is employed, the igniter, in modern blue water gas practice in this country, serves the double function of igniting the blow gases prior to passage through the waste heat boiler, and of storing heat for use in superheating the back-run steam. The latter function is important since it results in the saving of valuable generator fuel, which is usually considerably more expensive than ordinary boiler fuel. When the up-run water gas is passed through the igniter and boiler, the stored heat is usually also utilized in raising the temperature of the up-run water gas prior to entrance into the boiler. When a waste heat boiler is not employed, the igniter's igniting function is simply for the purpose of storing heat in its refractory heat storage material, for subsequent regenerative recovery.

The void spaces of the set are usually of sufficient size to contain a considerable quantity of blow gases, at the end of the blow, including a considerable quantity of nitrogen derived from the nitrogen content of the primary and secondary air. These blow gases, if not previously displaced from the set, will become commingled with the water gas and/or the water gas making steam during the run, adding their nitrogen content to the water gas recovered.

The quantity of such nitrogen will, of course, depend upon the amount of void space involved. In ordinary blue water gas apparatus, the quantity of such nitrogen is usually of the order of 6% to 7% of the total make gas. For some purposes to which the resulting water gas may be put, such as in synthetic ammonia production, a considerable nitrogen content in the gas may be inconsequential or even desirable, but in other uses, such, for example, as in its use as a raw material in the production of methanol, nitrogen dilutions of the above order may greatly impair the utility of the water gas, if not rendering it practically useless.

An important object of the present invention is the provision of apparatus and process in the use of which blue water gas of relatively low nitrogen content may be produced, without the loss of cycle time, which accompanies known methods of maintaining a low nitrogen content in the finished gas.

Figure 2:
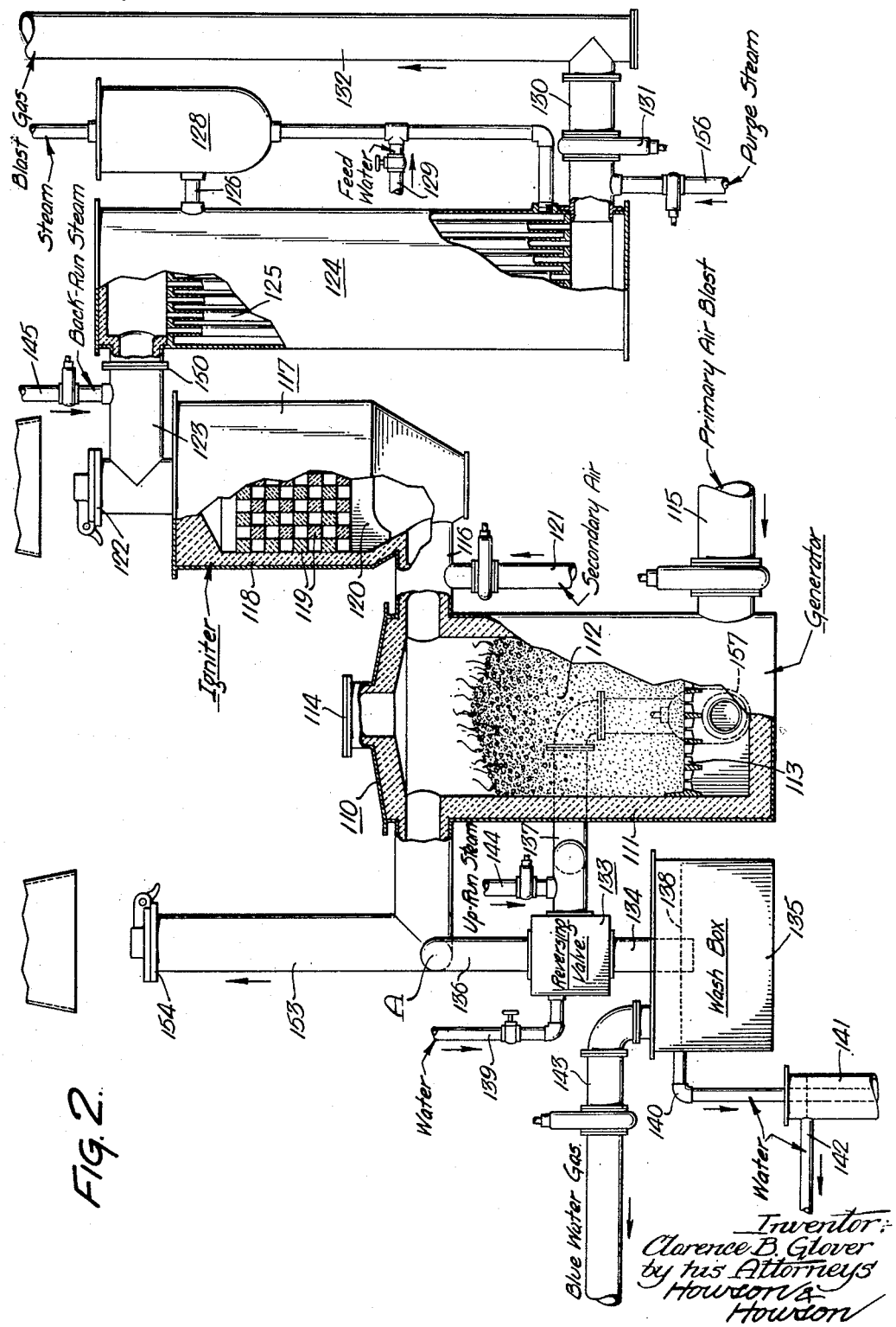

The invention will be illustratively described in connection with the figures, which show somewhat diagrammatically, forms of the apparatus of the invention, chosen for purposes of illustration, and in which, Figure 1 shows, partly in elevation and partly in vertical section, a blue water gas set modified in accordance with my invention; and Figure 2 shows, partly in elevation and partly in vertical section, a modification of the apparatus of Figure 1.

Referring to Figure 1:

10 generally indicates a water gas generator, provided with the refractory lining 11, and containing the ignited fuel bed 12, which is supported on grate 13, and may be replenished by way of coal hole branch 14.

The generator is illustrated as provided with the valved primary air supply conduit 15, for supplying air, under suitable pressure, for blasting the fuel bed upwardly, and with gas take-off connection 16, leading from the space above the fuel bed to the base of igniter 17.

The igniter is illustrated as provided with the refractory lining 18 and with refractory checker-brick 19 supported on arches 20. 21 indicates a valved secondary air supply conduit, and 22 indicates the igniter stack valve.

For convenience, apparatus is illustrated in which a waste heat boiler is provided which may be employed or not as desired, and which if employed, may be used for the recovery of heat from the blast gas during the blow and the up-run water gas during the run, or from the blast gas, but not from the water gas. It will be obvious from the following description, that, if desired, the waste heat boiler and connections leading thereto and therefrom may be omitted.

In the apparatus illustrated in Figure 1, gas take-off connection 23 leads from the space above the igniter checker-brick to the space above the upper tube sheet of waste heat boiler 24, which is provided with fire tubes 25, which terminate in the upper and lower tube sheets. Connections 26 and 27 connect the water space of the boiler with steam drum 28. 29 indicates a feed water supply connection.

Blast gas take-off connection 30 leads from the space below the lower boiler tube sheet, by way of the boiler stack valve 31, to the boiler stack 32, which communicates with the atmosphere.

Three way reversing valve 33 controls gas communication, through dip pipe 34 to wash box 35, from branch connection 36 which leads from the igniter top by way of gas take-off 23, and from back-run pipe 37, which leads from the generator base.

Dip pipe 34 extends below the level 38 of a body of sealing water in wash box 35, which is supplied from pipe 39, and which overflows by way of pipe 40, to and through seal pot 41, and thence by way of overflow pipe 42. Gas take-off 43, provided with a valve (not shown), leads from the wash box to storage or other disposal.

Steam for up-running through the fuel bed is illustrated as introduced from valved supply pipe 44, by way of back-run pipe 37, while steam for back-running is illustrated as introduced from valved supply pipe 45, by way of gas take-off connection 23, or from valved pipe 45a.

The waste heat boiler is illustrated as provided with gas take-off connection 46 leading from its base to branch connection 36, and serving, if desired, to lead up-run water gas from the base of the boiler to the wash box.

In the apparatus illustrated, in the event that it is desired to pass the up-run water gas through the waste heat boiler, branch connection 36 is blanked off by blanks inserted in blanking-off rings 48 and 49, while blanking-off rings 50, 51 and 52 have an open spacing ring between them.

If it is desired to pass the blow gases, but not the up-run water gas, through the waste heat boiler, connection 46 may be blanked off by blanks inserted in blanking-off rings 51 and 52, while spacing rings are inserted between blanking-off rings 48, 49 and 50.

If it is not desired to use the waste heat boiler, blanks are inserted in blanking-off rings 50 and 51, with spacing rings between blanking-off rings 48 and 49.

In accordance with my invention, in the apparatus illustrated in Figure 1, an auxiliary stack 53, provided with stack valve 54, is connected to the gas way through the set at a location on the down-stream side of the fuel bed top and on the up-stream side of the igniter void space, directions being referred to the above described flow of blast gas during the blow.

Stack 53 is shown, for illustration, connected with gas take-off 16 which leads from the generator top to the igniter base, but it may be connected elsewhere along the path of the blow gases.

In accordance with my invention, in the apparatus illustrated, valved purging steam supply pipes are provided, which are connected on the down-stream side (in the blast gas flow) of void spaces through which the blast gases pass in their flow through the set, or into which the blast gases may diffuse. These purge steam connections are so located, that with appropriate positioning of set valves and other closures, the blast gases may be purged from said void spaces and out of the set by way of stack 53. Such supplies of purge steam are illustrated as valved steam connection 55, entering branch connection 36 below rings 49, and valve steam connection 56, entering blast gas take-off connection 30 adjacent the boiler side of boiler stack valve 31.

If desired, a valve, such as valve 57, may be provided in the back-run pipe, adjacent the generator base and arranged to operate with the primary air blast valve, so that valve 57 closes when the valve in the primary air blast 15 opens and vice versa, thereby preventing diffusion of nitrogen containing air into the back-run pipe during the blow, while permitting the passage of up-run steam and back-run water gas during the run.

In an illustrative operation of the apparatus of Figure 1, in accordance with the present invention, with stack valves 22 and 54 closed, with boiler stack valve 31 open, with reversing valve 33 positioned to close off the back-run pipe 37, with blanks inserted between rings 48 and 49, with communication open through rings 50, 51 and 52, and with valve 57 closed (if employed), the fuel bed is blasted with primary air under suitable pressure from air supply pipe 15. The resulting producer gas is passed, by way of gas take-off connection 16, from the generator top into the base of the igniter, in which it is ignited with secondary air supplied through connection 21, the burning gases passing upwardly through the checker-brick. The resulting hot products of combustion pass by way of gas take-off connection 23 into the top of waste heat boiler 24 and downwardly through the fire tubes 25. The products pass from the base of the boiler through blast gas take-off connection 30 to the boiler stack 32 and thence to the atmosphere.

The blow raises the temperature of the fuel bed and stores heat therein by the primary combustion, while the secondary combustion raises the temperature of, and stores heat in, the refractory material of the igniter, further heat being removed from the blow gases in raising steam in the waste heat boiler by the passage of the hot products therethrough.

In usual water gas operation, at the end of the blow, the void spaces of the set down-stream from the fuel bed top are filled with blast gases having a high nitrogen content. In accordance with the present invention, shortly before the end of the blow period, auxiliary stack valve 54 is opened, boiler stack valve 31 is closed, the secondary air is shut-off, and purge steam is admitted through steam supply connection 55. During this latter part of the blow, while the blow gases pass almost directly from the generator to the atmosphere by way of the auxiliary stack 53, the purge steam simultaneously admitted through connection 55 purges the blow gases out of void spaces of the set, as it passes through connection 46 to the base of the boiler, upwardly through the fire tubes thence through the void space in the boiler top, through connection 23, through the void spaces of the igniter and to stack 53, by way of connection 16.

As a result, prior to the termination of the blow, void spaces of the set which are to be traversed, during the run, by the up-run water gas and the back-run steam, are purged of blast gases. This diversion of the blow gases and the purging of the void spaces traversed by the blow gases and those into which the blow gases may diffuse saves cycle time, which would otherwise have to be devoted to purging after the blow in ordinary operation, and very considerably increases capacity.

At the termination of the blow, the primary air supply 15 is shut off, valve 57 is opened (if employed), stack valve 54 is closed, and up-run steam is introduced to the base of the fuel bed by way of pipe 44 and back-run pipe 37. The resulting up-run blue water gas passes from the fuel bed top through connection 16, igniter 17, waste heat boiler 24, connection 46, reversing valve 33 and dip pipe 34, to the wash box 35, and thence by way of gas take-off 43 to storage or other disposal, traveling through a path previously purged of blast gases during the latter portion of the blow.

With efficient secondary combustion during the blow, the refractory material of the igniter will be heated to a higher temperature during the blow than the temperature of the up-run water gas entering it during the up-run, and the up-run water gas will be raised in temperature in the igniter and will carry a portion of the stored heat therefrom to the waste heat boiler.

At the termination of the up-run, three-way valve 33 is reversed, cutting off communication between connection 36 and the wash box, and putting the back-run pipe 37 in gas communication therewith. The up-run steam is simultaneously shut off and back-run steam is introduced through steam supply connection 45a or 45. The back-run steam passes reversely through waste heat boiler and/or the igniter 17, purging the path it traverses of up-run water gas and being superheated by heat previously stored in the igniter during the blow, and passes downwardly through the fuel bed, the resulting back-run water gas passing from the base of the generator to storage, by way of back-run pipe 37, reversing valve 33, dip pipe 34, wash box 35 and gas take-off 43.

At the termination of the back-run, the three-way valve is again reversed, the back-run steam supply is shut off, up-run steam supply 44 is turned on and a short up-run is made, the resulting up-run water gas following the path described above in the case of the previous up-run step. The passage of the steam through back-run pipe 37 and the generator base clears these void spaces of back-run water gas.

After the short up-run, with the stack valves closed and the secondary air still shut off, the primary air is turned on. The resulting producer gas pushes the up-run water gas remaining in down-stream portions of the set, through the wash box to storage, care being taken to open the boiler stack valve 31, before any undue quantity of nitrogen from the producer gas can pass into the wash box. With the opening of stack valve 31, the previously described cycle is repeated.

If it is desired to pass the blow combustion products but not the up-run water gas through the waste heat boiler, in the operation of the apparatus of Figure 1, blanks are inserted in the blanking-off rings 51 and 52 in connection 46, and the blanks are removed from blanking-off rings 48 and 49 in connection 36.

In such case, during the blow, the flow of the blast gases is as previously described, except that there is no opportunity for the blast gases to diffuse into connection 46, while they have an opportunity to diffuse into connection 36. During the latter part of the blow, when boiler stack valve 31 and the secondary air valve are closed and auxiliary stack valve 54 is open, purge steam is introduced from purge steam supply 55 as well as steam supply 56, simultaneously purging out connection 36 as well as the boiler, connection 23 and the igniter 17. During the up-runs, the up-run water gas passes from connection 23, through connection 36 and reversing valve 33 to the wash box and thence to storage, stack valve 31 preventing flow through the boiler though some diffusion into it may occur.

The back-run step is as previously described.

If it is not desired to employ the waste heat boiler, blanks may be inserted in blanking-off rings 50 in connection 23, and in blanking-off rings 51 in connection 46, cutting off all communication with the boiler, while communication is open through connection 36.

In such case, during the earlier portion of the blow, the igniter stack valve 22 is open and the combustion products pass to the atmosphere therethrough. During the latter part of the blow, auxiliary stack valve 54 is open and igniter stack valve 22 and the secondary air valve are closed. Purge steam is simultaneously introduced from steam supply 55 into connection 36, and flows through connection 36, and 23 to and through the igniter and connection 16 to stack 53, and to the atmosphere with the blow gas from the generator.

The up-run water gas flows from the igniter to storage by way of connections 23 and 36, reversing valve 33, dip pipe 34, wash box 35 and gas take-off 43. The back-run step is as previously described, except that back-run steam is not admitted through supply 45a. Immediately after the opening of the primary air blast valve, igniter stack valve 22 may remain closed for a brief period while the initially generated producer gas pushes the water gas of the last up-run out of the set to the wash box, igniter stack valve 22 being opened prior to the passage of any undue quantity of producer gas to the wash box.

Referring to Figure 2:

Figure 2 illustrates a form of the apparatus of the invention, particularly adapted for use in operations in which it is not desired to pass the blue water gas through the waste heat boiler.

110 is the generator, provided with refractory lining 111, and with the ignited fuel bed 112, supported on grate 113, and replenished through coal hole branch 114.

The generator is further provided, at its base, with valved primary air supply 115 and at its top with gas take-off connection 116, leading from the space above the fuel bed to the base of igniter 117. The igniter is illustrated as provided with refractory lining 118 and with refractory checker-brick 119, supported on arches 120. 121 indicates a valved secondary air supply, and 122 indicates the igniter stack valve.

The igniter is further provided with gas take-off connection 123, leading to the space above the upper tube sheet of waste heat boiler 124, the fire tubes of which are indicated at 125. Connections 126 and 127 lead from the water space of the boiler to steam drum 128. 129 is a valved feed water supply.

Blast gas take-off connection 130 leads from the space below the lower boiler tube sheet, by way of boiler stack valve 131, to boiler stack 132.

Three-way reversing valve 133 is adapted to open or close gas communication through dip pipe 134 to wash box 135, from connection 136, leading from the generator above the fuel bed, and from back-run pipe 137, leading from the generator below the fuel bed. Dip pipe 134 extends below the level 138 of sealing liquid, such as water, supplied through water connection 139, and overflowing by way of pipe 140 to seal pot 141 and thence through overflow pipe 142. Valved gas take-off 143 leads from the wash box to storage or other disposal.

Valved up-run steam supply pipe 144 is connected to back-run pipe 137 adjacent the three-way valve 133. Valved back-run steam supply pipe 145 is connected to connection 123.

Blanking-off rings 150, in connection 123, are adapted to cut off communication between the igniter and the boiler, when a blank is inserted between them.

Auxiliary stack 153, provided with stack valve 154, is illustrated as connected to the generator top, opposite gas take-off connection 116. Connection 136 leads to the three-way reversing valve from the base of stack 153.

A valved purge steam supply connection 156 is connected to blast gas take-off connection 130, adjacent the boiler side of boiler stack valve 131.

If desired, a valve, indicated at 157, may be provided in the back-run pipe 137, adjacent the generator base, to prevent diffusion of air into the back-run pipe from the generator base during the blow.

If desired, a dust catcher (not shown) may be provided in gas take-off 136, such, for example, as an ordinary boot leg connection extending downwardly from take-off 136 where it changes horizontal direction.

The operation of the apparatus of Figure 2, in accordance with the present invention, differs from any of the operations described in connection with Figure 1, in that the up-run water gas does not pass through the igniter.

During the blow, with stack valves 154 and 122 closed and boiler stack valve 131 open, with three-way valve 133 positioned to close back-run pipe 137, and with valve 157 closed (if employed), the fuel bed is blasted upwardly with primary air supplied through air supply 115. Secondary air is supplied through air supply 121, to ignite and burn the resulting producer gas in its passage through igniter 117, the hot products of combustion passing through gas take-off connection 123, to and through waste heat boiler 124, and thence to the atmosphere by way of connection 130 and boiler stack 132. The temperature of the fuel bed and of the refractory heat storage material of the igniter are raised and heat is stored therein, and steam is raised in the boiler by the hot products of combustion.

During the latter portion of the blow, auxiliary stack valve 154 is opened, boiler stack valve 131 is closed, and the secondary air is shut off. The blasting of the fuel bed with primary air is continued with the resulting blast gas passing from the generator top to the atmosphere through stack 153. Simultaneously purge steam is admitted, adjacent the boiler stack valve 131, through steam supply 156, thereby purging blast gases from the void spaces of the boiler, connection 123, the igniter and connection 116 to the atmosphere by way of the generator top and stack 153.

At the termination of the blow, the primary air is shut off, valve 157 is opened (if employed) the up-run steam supply 144 is turned on and an up-run made, the resulting up-run water gas passing through connection 136, three-way valve 133, and dip pipe 134, to wash box 135, and thence, by way of gas take-off 143, to storage or other disposal, without passing through igniter 117.

At the end of the up-run, the three-way valve 133 is reversed, steam supply 144 is shut off and back-run steam supply 145 turned on. The back-run steam is superheated in passing downwardly through the igniter checker-brick, by the heat previously stored therein during the blow. The superheated steam passes downwardly through the fuel bed, the resulting back-run water gas passing to storage or other disposal by way of back-run pipe 137, the three-way valve 133, dip pipe 134, wash box 135 and gas take-off 143.

At the end of the back-run, the three-way valve and the steam flow is again reversed, and a short up-run made with steam supplied again from supply 144, the resulting up-run water gas following the described path of the previous up-run.

At the end of the last up-run, valve 157 is closed (if employed) and with the secondary air still off, the fuel bed may be blasted with air very briefly before opening the boiler stack valve 131, to push the residual up-run water gas from the fuel bed and the fuel bed top to the wash box, care being taken to open stack valve 131, before any undue quantity of blast gases can pass into the wash box. This air blast with the stack closed should be even shorter than that described in connection with Figure 1, because of the shorter path from the fuel bed top to the wash box in Figure 2.

With the opening of the boiler stack valve 131, the cycle is repeated.

In the use of the apparatus of Figure 2, if it is not desired to use the waste heat boiler, a blank may be inserted between blanking-off rings 150. In such case, during the earlier portion of the blow, the igniter stack valve 122 is open, and during the latter part of the blow, when auxiliary stack valve 154 is open, the igniter stack valve is closed, and purge steam is admitted, for example, from the back-run steam connection 145. Other portions of the cycle may be as previously described. If desired, when a waste heat boiler is employed the back-run steam may be admitted to the base thereof as, for example, through purge steam connection 156.

Where it is not desired to pass the up-run water gas through the boiler, the use of the apparatus of Figure 2 has the advantage of avoiding its passage through the igniter as well. This avoids the carrying of stored heat out of the igniter by the up-run water gas, which is usually at a lower temperature, than the igniter checker-brick at the end of the blow. This leaves more heat in the igniter for use in superheating the back-run steam and/or transfers more heat to the boiler with the blow gases. Also less heat need be removed from the up-run water gas, in subsequent cooling operations after removal from the set.

Further, the arrangement permits the convenient use of shorter gas connections, reducing the void space.

Any of the above described operations, employing the apparatus of either figure, may be modified, if desired, by the inclusion of a brief step of up-running at the end of the blow before the closure of the auxiliary stack valve, thereby purging blast gases from the base of the generator, the fuel bed void spaces and from the generator top. In such case, it is desirable to close the auxiliary stack valve and to initiate the regular up-run before there is an undue loss of blue water gas up the auxiliary stack. During this brief up-run purge, the reverse purge through the waste heat boiler and/or igniter may be continued, if desired.

When the blow period is very short, and sometimes for other reasons, the blast gases issuing from the fuel bed may have insufficient combustible content to ignite. In such case, the secondary air supply may be omitted and the heat recovery from the blast gases limited to their sensible heat, at least a part of which may be stored in the heat regenerator (igniter then being a misnomer) for superheating the back-run steam and a part recovered in the waste heat boiler, if employed.

When the auxiliary stack is closed at the end of the blow, the reduction in nitrogen content of the make-gas may amount to more than 60% of the normal nitrogen content. If the auxiliary stack is allowed to remain open briefly after the beginning of the up-run, the nitrogen content of the make-gas may be reduced to a minimum.

The length of that portion of the blow during which the auxiliary stack valve is open and the set is being purged therethrough will of course depend upon the degree of the desired avoidance of nitrogen in the make-gas, and upon the amount and arrangement of the void space involved. The amount and arrangement of void space may vary widely with the size and arrangement of the set. Therefore, it is by way of illustration and not limitation that purging portions of the blow equivalent to from approximately 2% and less to 10% and more of the cycle length are mentioned, such, for example, as from 4% to 8%, in connection with the employment of the relatively short cycles of modern blue water gas practice.

As a specific example of the practice of the invention in apparatus similar to that of Figure 1, and having a 9 ft. I. D. generator, the following is given.

[Cycle length—2 minutes.]

| Cycle Step | Character | Percent of Cycle |
|---|---|---|
| Open Blow | Through boiler stack | 34 |
|  | Through auxiliary stack with reverse steam purge. | 6 |
| Up-Run | Water gas through igniter | 25 |
| Back-Run | Steam through igniter | 26 |
| Last Up-Run | Water gas through igniter | 6 |
| Air purge | All stacks closed | 3 |

Primary air rate _____cu. ft./min__ 20,000
Secondary air rate_____cu. ft./min__ 8,000
Reverse steam purge rate_____lbs./min__ 500–600
Up-run steam rate_____lbs./min__ 550
Back-run steam rate_____lbs./min__ 550
Air purge rate_____cu. ft./min__ 17,000

Obviously with such a short cycle, so highly subdivided, automatic valve operation is highly desirable, if not required. Likewise desirable is the use of a mechanical grate and an automatic fuel charger.

The invention has been described in connection with the reverse purging of the set toward the auxiliary stack, and this method is preferred since it does not require the use of a hot valve which is expensive to maintain. However, with the use of such a valve, for example, with the provision of a hot valve in gas take-off connection 16, on the igniter side of the stack 53, and with a purge steam connection on the igniter side of the hot valve, with the hot valve closed and boiler sack valve open, the igniter and waste heat boiler may be urged out through the boiler stack during the latter part of the blow, while the blow gases are being discharged from the generator through stack 53.

It will be readily apparent to those skilled in the art that the invention is quite applicable to the older blue water gas practice in which the down-run steam was not superheated and in which both the up-run and down-run water gas were passed through the igniter, in that case employed for its historic purpose of blast gas ignition, its heat storage function being of minor importance.

The invention has also been particularly described in connection with the reduction of nitrogen contamination in water gas and with the use of steam as the purging gas.

It will be obvious from the previous description that the invention is applicable to the reduction of contamination of the run gas by any component of the blow gases, which is absent from, or present in sufficiently low concentration in, the purging gas and any reaction products which may result from the use of the purging gas under the conditions obtaining.

Therefore, keeping this in mind, many purging gases other than steam may be employed, and the cyclic blow and run process to which the invention is applied may be other than a water gas producing process. Another such cyclic blow and run process is the production of CO by alternately blasting an ignited fuel bed with air in a blow portion of the cycle and with $CO_2$ in a run portion of the cycle. For some chemical purposes, a very pure CO product gas is derived, for others, freedom from hydrogen is a principal desideratum.

Obviously purging gases should not be employed which have an unduly deleterious effect upon the apparatus, or which unduly contribute other contaminations which are not readily removable while reducing those due to the blow gas. Depending upon the specific gas generated and the specific contamination to be avoided, gases such as carbon dioxide, carbon monoxide, nitrogen and others may be employed instead of or together with steam, as the purging gas. Steam has the advantage of being readily removable from the product gas by cooling and condensation and, in water gas manufacture, of reacting with carbon to form water gas.

Since reduction of contamination by blow gases is desired, such steps as "blow-runs," in the use of which considerable quantities of blow gases are recovered in admixture with run gas, will usually be avoided. Obviously, however, the blow gases need not necessarily be discharged to the atmosphere as waste gas, if their separate recovery is economically useful.

The more preferred use of my invention involves the purging out, during the terminal portion of the blow, of the greater part, if not substantially all, of the previous path of the blast gases from the generator during the earlier portion of the blow, and also the greater part, if not substantially all, of the connected path of the run-gas and/or run-gas-making fluid, into which blast gases may have considerably diffused during the earlier part of the blow. It is particularly preferred to purge at least the greater part, if not substantially all, of the common path of blast gases on the one hand and run-gas and/or run-gas-making fluid on the other hand. Parts of the respective gas paths beyond stack valves, in the case of blast gases, and beyond the water seal or equivalent closure, in the case of run-gas, are not considered to be within the set.

It will be obvious, that some of the advantages of my invention may be obtained with the purging, in the manner described, of very considerably smaller portions of the set void space. Considerable advantage may be obtained by purging out, during the terminal portion of the blow, at least the greater part of the igniter void space which is traversed by the run-gas and/or by the run-gas-making fluid; and where a waste heat boiler is employed, considerable further advantage may be obtained by thus also purging at least the major portion of the waste heat boiler void space which is traversed by such vapor phase material.

In the employment of my invention in water gas manufacture, when steam is employed as the purge gas, it may be practicable in some cases to employ the valved back-run steam connection as a purge steam supply. However, since this may considerably complicate the automatic control of the set, the use of separate valved back-run steam and steam purge connections is preferred. The latter may comprise a valved connection by-passing steam around the back-run steam valve, for entrance into the set through the same steam inlet as the back-run steam.

The invention is applicable to cyclic processes in which the fuel bed is blasted, during the blow, with a combustion-supporting gas, such, for example, as oxygen-enriched air instead of air having the usual oxygen content of atmospheric air, although particularly when employed for the reduction of nitrogen contamination, the advantages obtained may decrease with decreasing nitrogen content of the air employed; and in the claims "air" is intended to include oxygen-enriched air.

Further, the invention is not necessarily limited in its application to gas making processes employing a fuel bed. It may be applied to other cyclic gas making processes, in which fuel is burned in a primary combustion zone during a heating portion of the cycle, to store heat therein for utilization in a product gas generating period of the cycle, by reacting a gas-making fluid or fluids therein; and in which hot blast gases from the primary combustion zone are led along a heat recovery path, during the heating portion of the cycle, which is subsequently traversed, during the product gas generating portion of the cycle, by vapor phase material the contamination of which by residual blast gas remaining in the path will result in the contamination of the product gas. Such vapor phase material, as in the previously described water gas operations, may be gas generated during the product gas generating period of the cycle, and/or a gas making fluid employed therein.

For convenience, in certain of the claims, the term "run-vapor phase" is defined as meaning gas produced during the run and/or gas-making fluid used in the generation of gas during the run; and the term "water gas run-vapor phase" is defined as meaning water gas produced during the run and/or steam used to produce water gas during the run. Specific examples of "water gas run-vapor phase" are up-run water gas, down-run water gas, and back-run steam.

Other modifications of the process and apparatus than those above described may be made, within the scope of the claims, by those skilled in the art to which the invention applies upon becoming familiar therewith, without departing from the spirit of the invention, which is only intended to be limited as the appended claims may require.

I claim:

1. In a cyclic method for generating a product gas which comprises during a heating portion of the cycle burning fuel with a combustion-supporting gas in a primary combustion zone to raise the temperature thereof and to store heat therein while leading the resulting hot blast gases downstream therefrom through a separate heat recovery path containing heat storage material, and during a product gas generating portion of the cycle utilizing heat thus previously stored in said primary combustion zone for the generation of the product gas by reacting therein a suitable gas making fluid therefor, at least a portion of said separate heat recovery path being traversed during said product gas generating portion of the cycle by vapor phase material the contamination of which by blast gases results in the contamination of the product gas thereby; the improvement comprising in combination during the latter part of said heating portion of the cycle the steps of continuing the primary combustion of said fuel in said combustion zone while diverting blast gases resulting therefrom around at least a portion of said separate heat recovery path previously traversed by the blast gases during the earlier part of the heating portion of the cycle and to be traversed by said vapor phase material during said product gas upstream generating portion of the cycle, and simultaneously passing a purging gas into said portion of said heat recovery path thus by-passed by the blast gases to purge residual blast gases therefrom while said combustion and heat storage in said primary combustion zone continues.

2. In a cyclic method for producing water gas which comprises during a heating portion of the cycle blasting an ignited bed of solid fuel with air to raise the temperature thereof and to store heat therein while leading the resulting hot blast gas down-stream from said fuel bed through a separate heat recovery path including a heat storage zone having refractory heat storage material disposed therein, and thence to the atmosphere, and during a water gas generating portion of the cycle utilizing heat previously stored in the fuel bed for the generation of water gas by passing steam therethrough, at least a portion of said separate heat recovery path being traversed during the water gas generating portion of the cycle by vapor phase material the contamination of which by blast gases results in the contamination of the make-gas thereby; the improvement comprising in combination during the latter part of said heating portion of the water gas cycle the steps of continuing the blasting of said fuel bed with air while diverting the blast gases around at least a portion of said separate heat recovery path to the atmosphere and simultaneously passing a purging gas upstream toward said fuel bed through at least the portion of said separate heat recovery path thus by-passed by the blast gases and to be subsequently traversed by said vapor phase material to purge from said portion of said path to the atmosphere blast gases remaining therein from the passage of the blast gases therethrough during the earlier part of the heating portion of the cycle.

3. A process according to claim 2 in which after the termination of the heating portion of the cycle, void space of the fuel bed and void space below and above the fuel bed is purged of air and blast gases by passing steam upwardly through the fuel bed with the passage of resulting up-run water gas and excess steam to the atmosphere by way of the path traversed by said diverted blast gases during the latter part of the heating portion of the cycle.

4. In a cyclic blow and run method of producing water gas which comprises in a blow portion of the cycle blasting an ignited bed of solid fuel with primary air to raise the temperature thereof and to store heat therein, passing the resulting producer gas down-stream from said fuel bed through a separate heat recovery path including a heat storage zone having refractory heat storage material disposed therein, while burning said producer gas in said separate heat recovery path; and in a run portion of the cycle utilizing heat previously stored in said fuel bed for the generation of water gas by passing steam alternately upwardly and downwardly therethrough, the up-run water gas and the down-run steam alternately passing from and to the fuel bed respectively by way of at least the heat storage portion of said separate heat recovery path during the run portion of the cycle; the improvement comprising in combination the steps of continuing the air blasting of said fuel bed during the latter part of said blow portion of the cycle while by-passing the resulting blast gases to the atmosphere around the said separate heat recovery path, simultaneously with said continued air blasting passing a purging flow of steam through said heat storage zone in a reverse direction to the previous blast gas flow therein to purge residual blast gases therefrom, to the atmosphere, and subsequently during the run portion of the cycle passing up-run water gas from the fuel bed to storage by way of said purged heat storage zone, thereby reducing blast gas contamination of said up-run water gas by purging effected during the blow.

5. In a cyclic blow and run method of producing water gas which comprises in a blow portion of the cycle blasting an ignited bed of solid fuel with primary air to raise the temperature thereof and to store heat therein, passing the resulting blast gases with secondary air down-stream from said fuel bed through a separate heat recovery path including in series a heat storage zone having refractory heat storage material disposed therein, while burning said blast gases in said separate heat recovery path; and in a run portion of the cycle utilizing heat previously stored in said fuel bed for the generation of water gas by passing steam alternately upwardly and downwardly therethrough; the improvement comprising in combination the steps of continuing the air blasting of said fuel bed during the latter part of said blow portion of the cycle while by-passing the resulting blast gases to the atmosphere around the said separate heat recovery path, simultaneously with said continued air blasting passing a purging flow of steam through said heat storage zone in a reverse direction to the previous blast gas flow therein to purge residual blast gases therefrom, to the atmosphere, and subsequently during the run portion of the cycle alternately passing up-run water gas from the fuel bed to storage around said heat recovery path and passing the down-run steam to the fuel bed by way of said heat storage zone thus purged, thereby reducing blast gas-contamination of said down-run steam and hence the down-run water gas by purging effected during the blow.

6. In a cyclic blow and run method of producing water gas which comprises in a blow portion of the cycle blasting an ignited bed of solid fuel with primary air to raise the temperature thereof and to store heat therein, passing the resulting producer gas down-stream from said fuel bed through a separate heat recovery path including, in series, a heat storage zone having refractory heat storage material disposed therein and a zone of steam generation by indirect heat transfer, while burning said producer gas in said separate heat recovery path; and in a run portion of the cycle utilizing heat previously stored in said fuel bed for the generation of water gas by passing steam alternately upwardly and downwardly therethrough; the improvement comprising in combination the steps of continuing the blasting of said fuel bed with primary air during the latter part of said blow portion of the cycle while by-passing the blow gases to the atmosphere around the said heat recovery path, simultaneously with said continued air blasting passing a purging flow of steam through said steam generating and heat storage zones in a counter-flow direction to the previous blast gas flow therein, to purge residual blast gases therein to the atmosphere; and subsequently during the run portion of the cycle passing up-run water gas from the fuel bed to storage by way of at least the heat storage portion of the heat recovery path thus purged, and thereafter passing the down-run steam to the fuel bed by way of at least the heat storage zone portion of said path.

7. A method according to claim 6 in which the purging steam, the up-run water gas and the down-run steam each in their respective cycle periods pass through both the heat storage and steam generating zones of said separate heat recovery path.

8. In a cyclic blow and run method of producing water gas which comprises in a blow portion of the cycle blasting an ignited bed of solid fuel with primary air to raise the temperature thereof and to store heat therein, passing the resulting producer gas, with secondary air, down-stream from said fuel bed through a separate heat recovery path including in series a heat storage zone having refractory heat storage material disposed therein and a zone of steam generation by indirect heat transfer, while burning said producer gas in said separate heat recovery zone; and in a run portion of the cycle utilizing heat previously stored in said fuel bed for the generation of water gas by passing steam alternately upwardly and downwardly therethrough; the improvement comprising in combination the steps of continuing the air blasting of said fuel bed with primary air during the latter part of said blow portion of the cycle while discontinuing the admission of secondary air and while by-passing the resulting blow gases to the atmosphere around the said separate heat recovery path, simultaneously with said continued air blasting passing a purging flow of steam through said steam generating and heat storage zones in the direction of said fuel bed to purge residual blast gases from said zones to the atmosphere, and subsequently during the water gas generating portion of the cycle alternately passing up-run water gas from the fuel bed to storage and down-run steam to the fuel bed by way of at least the heat storage portion of said path thus purged during the blow.

9. In a cyclic blow and run method of producing water gas which comprises in a heating portion of the cycle blasting an ignited bed of solid fuel with primary air to raise the temperature thereof and to store heat therein, passing the resulting producer gas with secondary air downstream from said fuel bed through a separate heat recovery path including in series a heat storage zone having refractory heat storage material disposed therein and a zone of steam generation by indirect heat transfer, while burning said producer gas in said separate heat recovery path; and in a run portion of the cycle utilizing heat previously stored in said fuel bed for the generation of water gas by passing steam alternately upwardly and downwardly therethrough; the improvement comprising in combination the steps of continuing the blasting of said fuel bed with primary air during the latter part of said blow portion of the cycle while discontinuing the admission of second air and while by-passing the resulting blow gases to the atmosphere around the said separate heat recovery path, simultaneously with said continued primary air blasting passing a purging flow of steam reversely with respect to the previously described blast gas flow through said heat recovery path including said steam generating and heat storage zones to purge residual blast gases therefrom for passage to the atmosphere with the bypassed blow gases; and subsequently during the water gas generating portion of the cycle passing up-run water gas from the fuel bed to storage by way of at least the heat storage portion of the heat recovery path thus purged, and thereafter passing the down-run steam to the fuel bed by way of at least the heat storage portion of said path.

10. A cyclic method of producing water gas of low nitrogen content in a water gas set comprising a generator, an igniter and a connection between the generator outlet and the igniter inlet having a valved stack outlet, said igniter having a valved stack outlet and a gas outlet connected to a water sealed wash box, said method comprising during the terminal portion of the blasting period of the cycle passing blast gases from the generator through said first mentioned stack outlet while purging blast gases from said igniter and its connections with said second mentioned stack and with the wash box out through said first mentioned stack.

11. A method according to claim 10 in which said igniter and its said connections are steam purged to said first mentioned stack during the terminal portion of the blasting period of the cycle, thereby replacing blast gases in said portions of the set with steam.

12. A cyclic blow and run method of producing water gas of low nitrogen content in a water gas set comprising a generator adapted to contain an ignited fuel bed, an igniter and a waste heat boiler connected in series for blast gas flow therethrough from above the generator fuel bed to a valved stack connected to a blast gas outlet on the boiler, the igniter being provided with a make-gas outlet leading to a water sealed wash box having a gas take-off connection, and said set being provided with an additional valved stack connected to the passage between the top of said fuel bed and said igniter, said method comprising during a terminal portion of the blow period of the cycle passing blast gases from the fuel bed through said additional stack while counter currently steam purging the waste heat boiler and igniter in series therethrough, thereby replacing residual blast gases in said waste heat boiler and igniter with steam during said terminal portion of the blow period of the cycle.

CLARENCE B. GLOVER.

REFERENCES CITED

The following references are of record in the file of this patent:

UNITED STATES PATENTS

| Number | Name | Date |
|---|---|---|
| 1,630,300 | Klein | May 31, 1927 |
| 2,026,877 | Evans | Jan. 7, 1936 |
| 2,281,210 | Smith | Apr. 28, 1942 |